United States Patent [19]
Zhang

[11] Patent Number: 6,109,103
[45] Date of Patent: Aug. 29, 2000

[54] ROTATIONAL SPEED SENSING DEVICE

[75] Inventor: Xiaoqing F. Zhang, Peoria, Ill.

[73] Assignee: Caterpillar Inc., Peoria, Ill.

[21] Appl. No.: 09/235,439

[22] Filed: Jan. 22, 1999

[51] Int. Cl.$^7$ ...................................................... G01P 3/00
[52] U.S. Cl. ............................. 73/488; 73/494; 324/161
[58] Field of Search ........................... 73/488, 493, 494; 324/160, 161, 163, 164, 172, 173, 162, 166

[56] References Cited

U.S. PATENT DOCUMENTS

| | | | |
|---|---|---|---|
| 4,166,976 | 9/1979 | Ruhnau et al. | 324/166 |
| 4,382,388 | 5/1983 | Ono | 73/861.18 |
| 4,604,575 | 8/1986 | Shimizu et al. | 324/208 |

*Primary Examiner*—Helen C. Kwok
*Attorney, Agent, or Firm*—Haverstock, Garrett & Roberts; W. Bryan McPherson

[57] ABSTRACT

A rotational speed sensing device is disclosed which comprises a reference member adapted to be rotated at a reference speed, a rotational device coaxial with the reference member, the rotational device adapted to be rotated at a speed, a sensor associated with either the reference member or the rotational device and being rotated, the sensor for determining a speed differential between the reference member and the rotational device, and a controller electrically connected to the reference member and the sensor, the controller for receiving signals from the reference member and the sensor indicative of the reference speed and the speed differential, the controller for determining the speed of rotation of the rotational device based upon the difference between the reference speed and the speed differential.

19 Claims, 1 Drawing Sheet

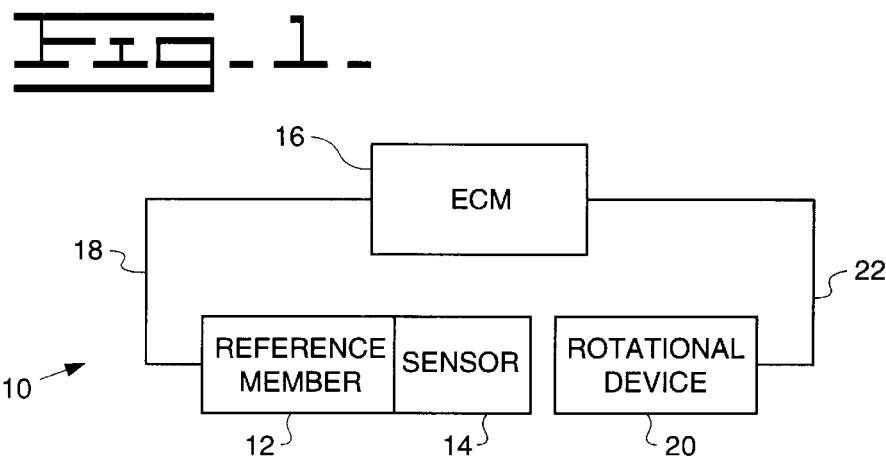
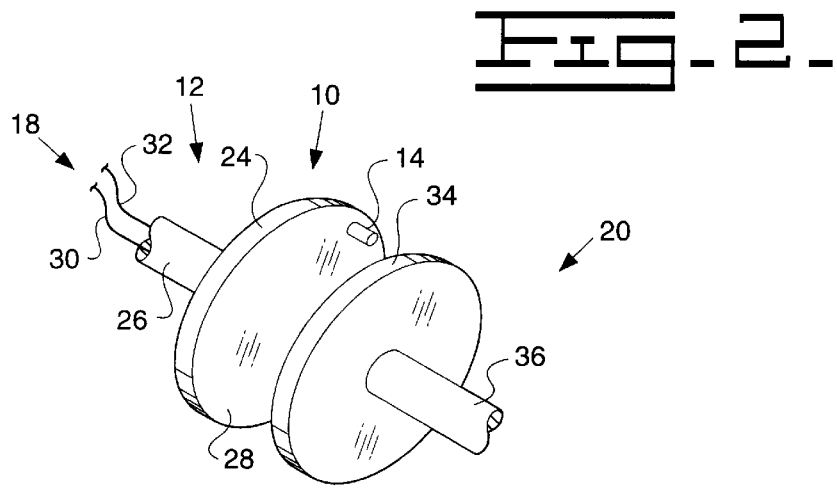
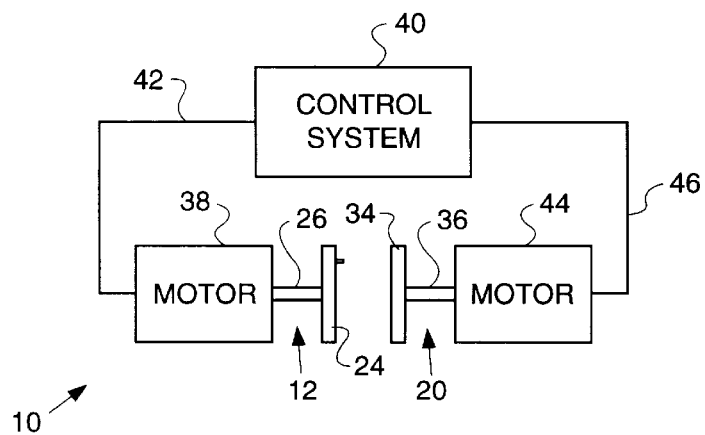

ROTATIONAL SPEED SENSING DEVICE

TECHNICAL FIELD

This invention relates generally to a device for sensing rotational speed of an object and more particularly to a sensing device for accurately measuring the speed of rotation of another object.

BACKGROUND ART

In present systems, such as transmissions and motors for heavy industrial equipment, it is desirable to determine or monitor the speed of rotation of certain objects within the systems. Typically, a fixed sensor is attached to or on a casing associated with the system to measure the rotational speed of an object to be monitored. Although such a fixed sensor is acceptable for most speed sensing applications, there are situations where a fixed sensor is unable to accurately measure the speed of rotation of an object. For example, measuring the speed at zero speed or in the near zero speed region cannot be accomplished with such fixed sensors. Additionally, such fixed sensors cannot provide a high sampling or update rate at zero speed or near zero speed. Currently, in order to achieve the sampling rate, tone wheels or gears having a plurality of teeth have to be used. These help to provide a sampling rate in the medium to low speed region but does not solve the sampling rate problem in the extremely low speed region, especially at the zero speed point. Another problem associated with fixed sensors is sensing directional rotational speed requires quadrature decoding hardware. Directional rotational speed sensing is needed in transmission systems, hydraulic motor systems, and low speed marine diesel motor systems, for example. Currently, phase differential dual sensor quadrature decoding scheme is used to handle directional rotational speed sensing which requires two dedicated sensors.

In view of the above, it would be desirable to provide a sensing device which is capable of accurately measuring the rotational speed of an object at any speed. Further, it would be advantageous to provide a sensor device which is capable of providing a high sample rate at zero speed or in the near zero speed region.

Accordingly, the present invention is directed to overcoming one or more of the problems as set forth above.

DISCLOSURE OF THE INVENTION

In one embodiment of the present invention, a rotational speed sensing device is disclosed which comprises a reference member adapted to be rotated at a reference speed, a rotational device coaxial with the reference member, the rotational device adapted to be rotated at a speed, a sensor associated with one of the reference member and the rotational device being rotated by the reference member, the sensor for determining a speed differential between the reference member and the rotational device, and a controller electrically connected to the reference member and the sensor, the controller for receiving signals from the reference member and the sensor indicative of the reference speed and the speed differential, the controller for determining the speed of rotation of the rotational device based upon the difference between the reference speed and the speed differential.

Another embodiment of the present invention is a rotational speed sensing device for sensing the speed of an object which comprises a reference member adapted to be rotated at a reference speed, a rotational device coaxial with the reference member, the rotational device adapted to be rotated at a speed, a sensor associated with one of the reference member and the rotational device being rotated by the reference member, the sensor for determining a speed differential between the reference member and the rotational device, a first controller electrically connected to the reference member and the sensor, the controller for receiving signals from the reference member and the sensor indicative of the reference speed and the speed differential, the controller for determining the speed of rotation of the rotational device based upon the difference between the reference speed and the speed differential, and a second controller electrically connected to the rotational device for controlling operation of the rotational device, the second controller being connected to the first controller for receiving therefrom information corresponding to the speed of rotation of the rotational device and for determining whether the speed of the rotational device needs to be adjusted.

In another embodiment of the present invention a rotational speed sensing device for sensing the speed of an object comprises a reference member adapted to be rotated at a reference speed, a rotational device coaxial with one of the reference member, the rotational device adapted to be rotated at a speed, a sensor associated with the reference member and the rotational device being rotated by the reference member, the sensor for determining a speed differential between the reference member and the rotational device, a first electronic control module connected to the reference member and the sensor, the controller for receiving signals from the reference member and the sensor indicative of the reference speed and the speed differential, the controller for determining the speed of rotation of the rotational device based upon the difference between the reference speed and the speed differential, and a second electronic control module connected to the rotational device for controlling operation of the rotational device, the second electronic control module being connected to the first electronic control module for receiving therefrom information corresponding to the speed of rotation of the rotational device and for determining whether the speed of the rotational device needs to be adjusted.

BRIEF DESCRIPTION OF THE DRAWINGS

FIG. 1 is a block diagram of a rotational speed sensing device constructed according to the present invention;

FIG. 2 is a perspective view of the speed sensing device constructed according to the present invention; and FIG. 3 is a block diagram of the speed sensing device shown in FIG. 2 with the device shown connected to the electronic control module.

BEST MODE FOR CARRYING OUT THE INVENTION

Referring now to the drawings, FIG. 1 illustrates a rotational speed sensing device 10 constructed according to the present invention with the device 10 comprising a reference member 12 which is adapted to be rotated at a known or reference speed. In the preferred embodiment, a sensor device 14 is connected to or attached to the reference member 12 and is rotated by the reference member 12. Although a preferred embodiment is described as a sensor device 14 being connected to or attached to the reference member 12, it will be appreciated by those skilled in the art that the sensor device 14 may be connected to or attached to the rotational speed sensing device 10 without deviating from the spirit and scope of the present invention. Examples of suitable forms of the sensor device 14 are hall effect type sensors, magnetic pick-up type sensors, variable reluctance type sensors, or photoelectric type sensors. The reference member 12 and the sensor 14 are connected to an electronic control module (ECM) 16 by an electrical connection 18. The ECM 16 is a control module or a controller type device having a microprocessor (not shown) or other suitable electronic circuitry for receiving signals from the reference member 12 and the sensor device 14 and for transmitting signals over the connection 18 for controlling operation of the reference member 12 and the sensor device 14.

The ECM 16 is also connected to a rotational device 20 via an electrical connection 22. The rotational device 20 is capable of rotating at any speed and in any direction. For example, the rotational device 20 may have a speed near zero. The rotational device 20 is positioned or located to be co-axial with the reference member 12 and the sensor device 14. The reference member 12 and the rotational device 20 may rotate at the same or different speeds.

Referring now to FIG. 2, the rotational speed sensing device 10 is shown to comprise the reference member 12 having a circular disk portion 24 which is connected to a shaft 26. The disk portion 24 has a disk surface 28 which has connected or attached thereto the sensor device 14. The shaft 26 may be connected to a motor (not shown) and the electrical connection 18 may be inserted through the shaft 26 as is shown by a pair of wires 30 and 32. The shaft 26 may be rotated at a known or a reference speed and this speed is communicated to or provided to the ECM 16. Rotation of the shaft 26 causes the disk portion 24 and the sensor device 14 to be rotated at the reference speed. The rotational device 20 is also shown to comprise a circular disk portion 34 which is connected to a shaft 36. The disk portion 34 and the shaft 36 are adapted to be rotated by another device, such as a motor which is not shown. The speed at which the rotational device 20 rotates is unknown and needs to be determined in order to verify that operation of the rotational device 20 is performing properly.

In operation of the rotational speed sensing device 10, the speed of rotation of the rotational device 20 may be determined by first knowing the speed of rotation of the reference member 12 and subtracting therefrom a speed differential which is provided from the sensor device 14. The speed determined or picked up by the sensor device 14 is the speed differential between the disk portions 24 and 34 or the shafts 26 and 36. In other words, the difference between the known rotational speed of the reference member 12 and the measured speed differential is the rotational speed of the rotational device 20. The speed of rotation of the rotational device 20 is easily calculated or determined by suitable means or circuitry within the ECM 16.

FIG. 3 illustrates the rotational speed sensing device 10 having the reference member 12 which includes the disk portion 24 connected to the shaft 26 with the shaft 26 being rotated by a motor 38. The sensor device 14 is also shown attached to the disk portion 24. The motor 38 is connected to a control system 40 via a lead 42. The control system 40 may include the ECM 16 or a plurality of electronic control modules. The lead 42 is also connected to the sensor device 14 for providing signals to the control system 40. Any suitable motor 38 may be employed with the understanding that the motor 38 may be controlled by the control system 40 to rotate the reference member 12 at the known or reference speed.

The rotational device 20 is further shown in FIG. 3 to include the disk portion 34 and the shaft 36 with the shaft 36 connected to a motor 44. The motor 44 is used to rotate the rotational device 20 at any speed. The motor 44 is connected to the control system 40 by an electrical lead 46. The reference member 12 and the rotational device 20 are shown to be co-axial with each other. The control system 40 is employed to control operation or the speed of the rotational device 20. Depending upon the determined or measured speed of the rotational device 20 the control system 40 may increase or decrease the speed of the rotational device 20. For example, the device 10 determines that the measured speed of the rotational device 20 is too fast a signal may be sent over the lead 46 to slow down or decrease the speed of the motor 44. On the other hand, a determination that the speed of the rotational device 20 is too slow a signal is sent over the lead 46 to increase the speed of the motor 44. It may also be decided, by the control system 40, that the measured speed of the rotational device 20 is correct or within some predetermined limits and then there would be no signal to either increase or decrease the speed of the motor 44.

As noted above, the control system 40 may include the ECM 16 or may also include one ECM connected to the reference member 12 and another ECM connected to the rotational device 20 with each ECM connected to each other. In this manner, the two ECM's would communicate with each other to transfer information. For example, signals indicative of the measured speed would be provided from one ECM to the other ECM to thereby control operation or the speed of the rotational device 20.

INDUSTRIAL APPLICABILITY

The present invention is applicable in situations where the rotational speed of an object needs to be detected or monitored in order to avoid damage to the object. The present invention is useful to accurately sense rotational speed of an object rotating at zero speed and in the near zero speed region. The present invention may be used where high sampling rates are critical, such as in control applications, especially closed-loop control applications. Further, the present invention is useful where directional rotational speed sensing is required, such as in transmission systems, hydraulic motor systems, and low speed marine diesel motor systems. Other aspects, objects and advantages of the present invention can be obtained from a study of the drawings, the disclosure and the appended claims.

What is claimed is:

1. A rotational speed sensing device for sensing the speed of a rotational device, the rotational device adapted to be rotated at a speed, the device comprising:

a reference member adapted to be rotated at a reference speed, said reference member being coaxial with the rotational device;

a sensor associated with one of the reference member and the rotational device being rotated, the sensor for determining a speed differential between the reference member and the rotational device; and a controller electrically connected to the reference member and the sensor, the controller for receiving signals from the reference member and the sensor indicative of the reference speed and the speed differential, the controller for determining the speed of rotation of the rotational device based upon the difference between the reference speed and the speed differential.

2. The rotational speed sensing device of claim 1 wherein the reference member comprises a disk portion connected to a first shaft.

3. The rotational speed sensing device of claim 2 wherein the disk portion further comprises a disk and the sensor is connected to a surface of the disk.

4. The rotational speed sensing device of claim 2 wherein the first shaft is connected to a motor for the first shaft to be rotated by the motor at the reference speed.

5. The rotational speed sensing device of claim 1 wherein the rotational device comprises a disk portion connected to a shaft.

6. The rotational speed sensing device of claim 1 wherein the controller is electrically connected to the rotational device for controlling operation of the rotational device.

7. The rotational speed sensing device of claim 1 wherein the sensor comprises a hall effect sensor.

8. A rotational speed sensing device for sensing the speed of a rotational device, the rotational device adapted to be rotated at a speed, the device comprising:

a rotational device coaxial with a reference member, the rotational device adapted to be rotated at a speed;

a sensor associated with one of the reference member and the rotational device being rotated by the reference member, the sensor for determining a speed differential between the reference member and the rotational device;

a first controller electrically connected to the reference member and the sensor, the controller for receiving signals from the reference member and the sensor indicative of the reference speed and the speed differential, the controller for determining the speed of rotation of the rotational device based upon the difference between the reference speed and the speed differential; and a second controller electrically connected to the rotational device for controlling operation of the rotational device, the second controller being connected to the first controller for receiving therefrom information corresponding to the speed of rotation of the rotational device and for determining whether the speed of the rotational device needs to be adjusted.

9. The rotational speed sensing device of claim 8 wherein the reference member comprises a disk portion connected to a shaft.

10. The rotational speed sensing device of claim 9 wherein the disk portion further comprises a disk surface and the sensor is connected to the disk surface.

11. The rotational speed sensing device of claim 9 wherein the shaft is connected to a motor for the shaft to be rotated by the motor at the reference speed.

12. The rotational speed sensing device of claim 8 wherein the rotational device comprises a disk portion connected to a shaft.

13. The rotational speed sensing device of claim 8 wherein the sensor comprises a hall effect sensor.

14. The rotational speed sensing device of claim 8 wherein said first controller includes a first electronic control module and said second controller includes a second electronic control module.

15. The rotational speed sensing device of claim 2 wherein the rotational device comprises a disk portion connected to a second shaft.

16. A rotational speed sensing device for sensing the speed of a rotational device, the rotational device adapted to be rotated at a speed, the device comprising:

a reference member adapted to be rotated at a reference speed independent of the rotational device, said reference member being coaxial with the rotational device;

a sensor associated with one of the reference member and the rotational device being rotated, the sensor for determining a speed differential between the reference member and the rotational device; and a controller electrically connected to the reference member and the sensor, the controller for receiving signals from the reference member and the sensor indicative of the reference speed and the speed differential, the controller for determining the speed of rotation of the rotational device based upon the difference between the reference speed and the speed differential.

17. The rotational speed sensing device of claim 16 wherein the reference member comprises a disk portion connected to a first shaft, wherein the first shaft is connected to a motor for the first shaft to be rotated by the motor at the reference speed.

18. The rotational speed sensing device of claim 17 wherein the disk portion further comprises a disk and the sensor is connected to a surface of the disk.

19. The rotational speed sensing device of claim 16 wherein the rotational device comprises a disk portion connected to a second shaft.

* * * * *